United States Patent [19]
Blair

[11] Patent Number: 5,351,084
[45] Date of Patent: Sep. 27, 1994

[54] COMPRESSED VIDEO BIT RATE REDUCTION SYSTEM

[75] Inventor: Bruce A. Blair, San Diego, Calif.

[73] Assignee: Global Telecommunications Industries, Inc., Washington, D.C.

[21] Appl. No.: 909,062

[22] Filed: Jul. 2, 1992

[51] Int. Cl.$^5$ .............................................. H04N 7/13
[52] U.S. Cl. .................................... 348/390; 348/574
[58] Field of Search ..................... 358/133, 455, 166; H04N 7/13

[56] References Cited

U.S. PATENT DOCUMENTS

| | | | |
|---|---|---|---|
| 3,562,420 | 2/1971 | Thompson | 178/6 |
| 3,656,152 | 4/1972 | Gunderson | 340/347 |
| 3,678,388 | 7/1972 | Peterson | 358/455 |
| 3,699,446 | 10/1972 | Sainte-Beuve | 325/38 A |
| 3,739,082 | 6/1973 | Lippel | 178/6 |
| 3,877,022 | 4/1975 | Lehman | 340/347 |
| 3,999,129 | 12/1976 | Kasson | 325/42 |
| 4,032,977 | 6/1977 | Liao | 358/455 |
| 4,095,259 | 6/1978 | Sawagata | 358/141 |
| 4,187,466 | 2/1980 | Kasson et al. | 325/42 |
| 4,334,237 | 6/1982 | Reitmeier et al. | 358/36 |
| 4,402,015 | 8/1983 | Yamada | 358/455 |
| 4,447,803 | 5/1984 | Crosby et al. | 340/347 |
| 4,543,599 | 9/1985 | Willis et al. | 358/13 |
| 4,566,028 | 1/1986 | Lewis et al. | 358/21 |
| 4,647,968 | 3/1987 | Willis | 358/141 |
| 4,761,634 | 8/1988 | Yamaguchi et al. | 340/347 |
| 4,812,846 | 3/1989 | Noro | 341/131 |
| 4,827,343 | 5/1989 | Naimpally | 358/183 |

*Primary Examiner*—Howard W. Britton
*Attorney, Agent, or Firm*—Edward Dreyfus

[57] ABSTRACT

A system and method for increasing the color or luminance gray scale levels from, for example 16 to 32, without increasing the transmission bit rate to produce sharper images with less band width requirement. An error level or pedestal is added to the analog signal of each pixel or every other video unit, such as a line. After decompression, the digital signals of one unit are added to those of the adjacent unit—pixel by corresponding pixel—to yield double the gray scale levels but for a signal twice the proper value. The signal value is then divided by two, yielding a signal of the proper value but at twice the number of possible gray scale levels. In 4-bit video, the result is to convey 5-bit video with the use of two adjacent transmitted 4-bit words and to generate the 5-bit word in the post processor after decompression.

10 Claims, 4 Drawing Sheets

COMPRESSED VIDEO BIT RATE REDUCTION SYSTEM

FIELD OF INVENTION

This invention relates to video systems and more particularly to signal processing apparatus and methods for improving the performance of video transmission systems so that better and sharper images can be transmitted and displayed with less bandwidth requirements then is possible with prior art systems.

BACKGROUND OF INVENTION

Much progress has been made in the art of transmitting digital video signals for use by receiving terminals in a variety of applications such as video phones, video conference, and the like. High speed transmission services, such as T 1.5 carrier, ISN, 168 kilobit, 45 Megabit, ISDN and others are available to accommodate the high bandwidth required for video information transmission. In addition, data compression-decompression techniques are used to pack more video data into a given bandwidth which aids real time video and other applications.

Notwithstanding these and other advances, the high data content of full motion video prior art systems still require an undesirable technical trade-off between the nature of the transmission capacity and the informational content required per unit of time for satisfactory video images. Serious bandwidth constraints arise when transmission occurs over analog telephone lines or when color information is part of the video informational content.

Data compression techniques only partially relieve these problems by reducing somewhat the number of bits needed to convey video images. In some cases, these techniques introduce other quality problems such as less definition. haloing, shadowing, aliasing, imperfect diagonal lines, and noise generation that simulates information generation thus wasting bandwidth.

Today it is common practice to use 4-bit video as a method to reduce data rates in compressed video. In standard systems, the decommpression process attempts to restore the signal to its original 8-bit form. However, the number of gray scale levels in the ultimate display is determined by the smallest number of bits used anywhere in the signal path. The additional 4-bits are required by other techniques such as smoothing of edges, and/or removing other artifacts introduced by the compression/decompression process. Consequently, the standard receiver generates a 4-bit video signal representing the gray scale level of each pixel, i.e. a 16 level gray scale. Further, gray scale levels would require more bandwidth. Since the human eye perceives 20+ gray scale levels, standard systems trade off more discernable gray scale levels for the lower bit rate.

SUMMARY OF THE INVENTION

The present invention provides a system for improving the quality of the ultimately displayed image so that less information need be transmitted for a given quality level of desired video picture to be viewed. More specifically, The present invention increases the grey scale from, for example, 16 to 32 without increasing bandwidth requirements. Haloing, shadowing, and other problems are therefore reduced or avoided without sacrificing bandwidth.

One embodiment of the present invention provides artificially increasing the brightness of the video analog signal of every other line of the video signal prior to the compression stage. At the receiving end, after decompression, the video signal that includes the introduced error is averaged with the adjacent line (or, in an alternate embodiment of the invention, adjacent field values) to produce an error $\frac{1}{2}$ the value of the introduced error.

The ultimate video display will have more grey scale levels so that digitizing errors are eliminated from the viewers perception.

In addition, the technique and apparatus according to the invention includes vertical filtering the decompressed analog video signals to improve aliasing effects and diagonal line performance of the system.

The above advantages are achieved by the present invention without requiring a net increase in bandwidth.

Other and further advantages of the present invention will become apparent with the following detailed description of an example thereof.

DETAILED DESCRIPTION OF EMBODIMENT

Figure 1A:
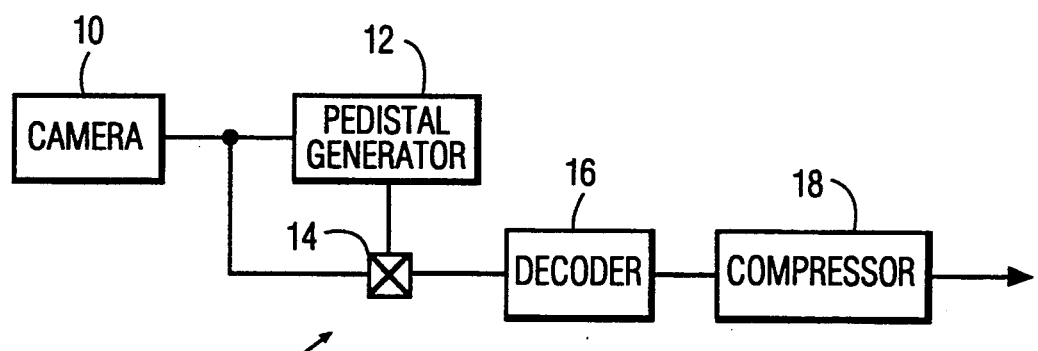
FIGS. 1A and 1B depict generally the system according to the present invention.
Figure 1B:
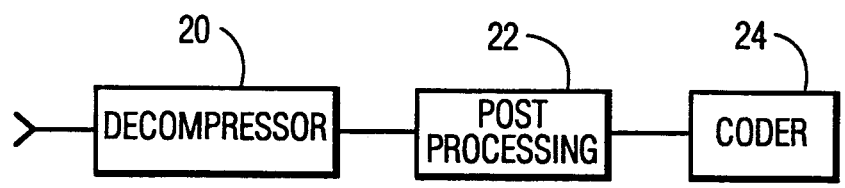

With reference to FIGS. 1A and 1B, a system according to the present invention is shown comprising a video source 10, such as a camera, VCR, or the like, applying composite analog signals including synchronization, blanking, color and luminance information to a preprocessing apparatus that in turn includes an error or pedestal generator 12 and a mixer 14. Preprocessing apparatus functions to artificially raise the analog signal amplitude level of alternate lines to intentionally introduce an amplitude error or pedestal for all pixel representing analog signals in alternate lines. The output of pedestal generator 12 is mixed with the unprocessed video analog signals in mixer 14 and the output of mixer 14 appears in normal 4-bit video format to the following circuits. The pedestal information remains as part of the alternate line information.

Decoder 16 converts NTSC composite analog signals to R, G, B or Y, (R-Y), or (B-Y) components, and compressor 18 coverts the signals to digital representations and reduces the number of bits in preparation for transmission over the designed media such as air waves, fiber, telephone lines, etc.

Camera 10, decoder 16 and compressor 18 may be conventional, well known prior art apparatus and need not be further described herein.

At the receiving end (FIG. 1B), the transmitted digital video signals are received and prepared for decompression by conventional means (not shown). Decompressor 20 and digital to analog coder 24 are also well known apparatus and function to process the video signals in a well known manner and need not be further described herein.

Decompressed digital signals are applied to the input of a post processing apparatus 22 that functions to use the pedestal analog information to raise the gray scale level, for example, from a standard 16 to 32 for 4 bit video. In this way, aliasing effects resulting from compression/decompression are reduced and sharper images are discernable by the viewer with the same transmission bit rate. In addition, post processing apparatus 22 serves to improve the diagonal line resolution by functioning as a vertical filter to compensate for dropping fields or portions thereof in the compression process at the transmitter side.

In operation, the embodiment of the invention described below in relation to FIGS. 2 and 3 separates the video image from video source 10 into two images, interleaved on alternate lines. One image is unmodified, whereas preprocessor 11 adds to the active video signals of the other a pedestal comprising, for example, 1/32 of the maximum video analog level. The resulting composite image is then decoded, digitized and compressed into 4-bit video signals prior to transmission. The introduced alternate line error has encoded one 5-bit image into two 4-bit halves. After transmission and decompression, the 5-bit image is recovered by the post processing apparatus 22 adding the corresponding image signals together and then dividing the result by 2 to restore the original 5-bit level which can be one of 32 gray scale levels instead of the conventional one of 16 gray scale levels.

An alternate embodiment and method of the invention comprises preprocessing apparatus adding the 1/32 level pedestal to all video signal of alternate fields and then post processing apparatus 22 would use a field delay, summer and averaging to recover the 5-bit level signals from corresponding pixel information in adjacent field.

Another embodiment and method of the invention employs an adaptive combination of the adjacent line averaging and adjacent field averaging processes and a sensing and control apparatus (not shown) that would sense the static and dynamic content of the video image and initiate adjacent line or field averaging in response to predetermined image criteria.

Figure 2:
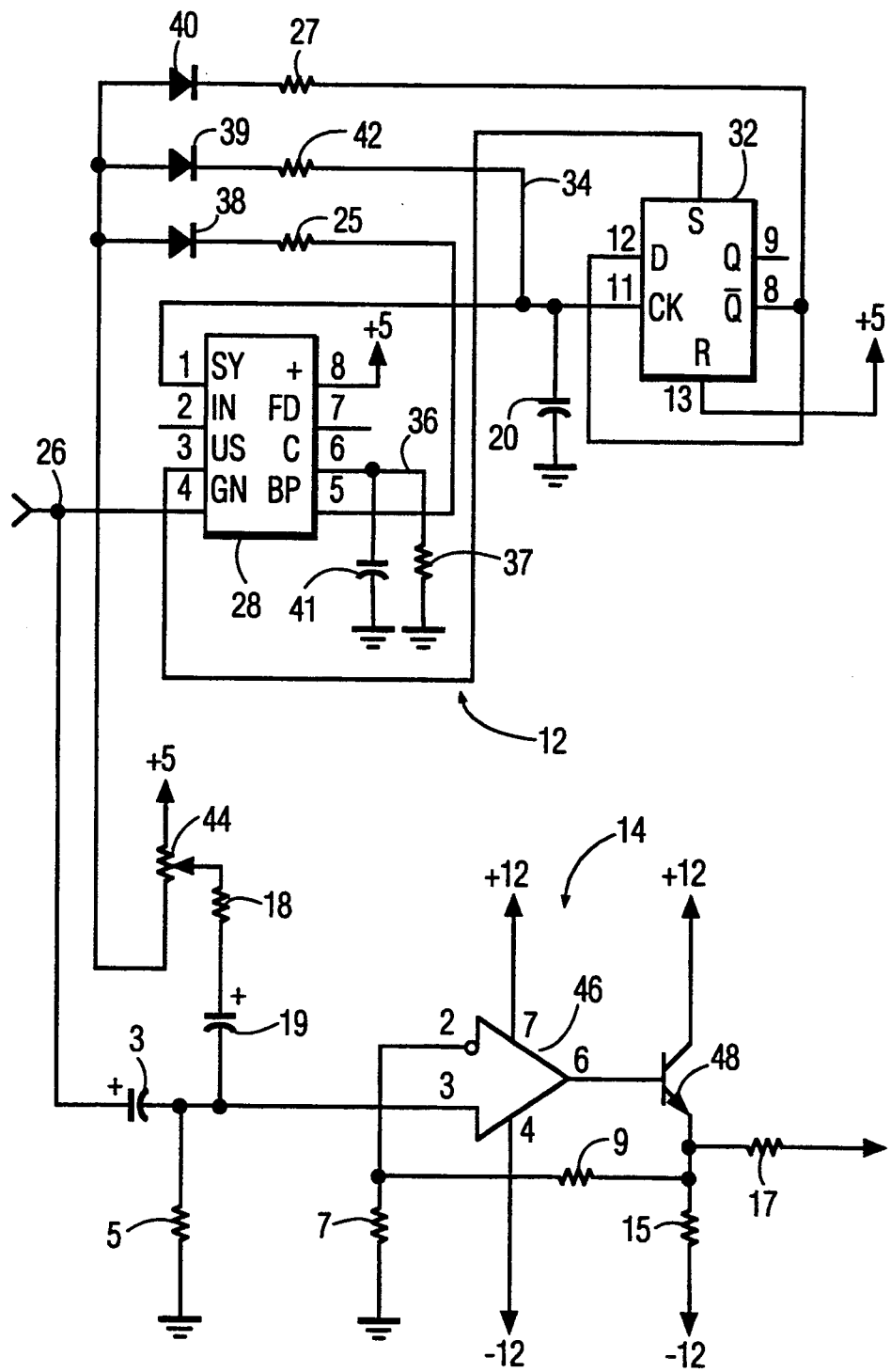
FIG. 2 depicts one example of the preprocessing apparatus 11 of FIG. 1.

With reference to FIG. 2, an example of the preprocessing apparatus 11 is shown in detail. Composite analog signals arrive at the input 26 that is connected to pedestal generator 12 and mixer 14. Generator 12 includes a microchip 28 that accepts composite video analog signals and separates sync signals from composite video information signals. Horizontal sync signals appear on pin 1, lead 30 and vertical sync signals appear on pin 3, lead 34 and are applied to microchip 32. Back porch and blanking information appear on pin 5, lead 36. Capacitor 41 value sets the back porch signal pulse width.

Chip 32 comprises a D flip-flop or register wired to divide by 2 producing a ½ horizontal rate square wave in time with the sync signals. Thus, the square wave will go "high" every other video line. The vertical signal resets the flip-flop to a zero state at the beginning of each field. Diodes 38, 39 and 40 form an AND gate for their input signals, i.e. the separated sync signal, the back porch signal, and the ½ horizontal rate square wave. In this way, the output of the pedestal generator 12 is restricted to the active video portion of the television line. It will be understood that the blanking signal in this circuit simulates the actual blanking signal. Alternatively, circuits could be incorporated to apply the actual blanking signal, if desired.

The full amplitude pedestal signal is applied to variable resistor 44, the value of which is set at final calibration and test. The setting of resistor 44 determines the amplitude of the pedestal summed into the original video signal applied to mixer 14. In one example, this amplitude is set to ½ of the least significant bit. For 4-bit video, the least significant bit represents 1/16 th of the maximum analog signal amplitude. Therefore, resistor 44 is set so that the square wave amplitude equals 1/32 of the maximum analog video signal amplitude. The result is that the square wave pedestal of 1/32 max amplitude is added to all signals of every other line of the composite analog signals. The resulting signals are applied to operational amplifier 46 which in turn applies its output to output transistor 48.

As will be seen below, the signal level content of adjacent lines are summed pixel by pixel to create 5 bit video (32 gray scale levels where originally there had been 16) out of 4-bit video without adding to the transmission bit rate.

Figure 3:
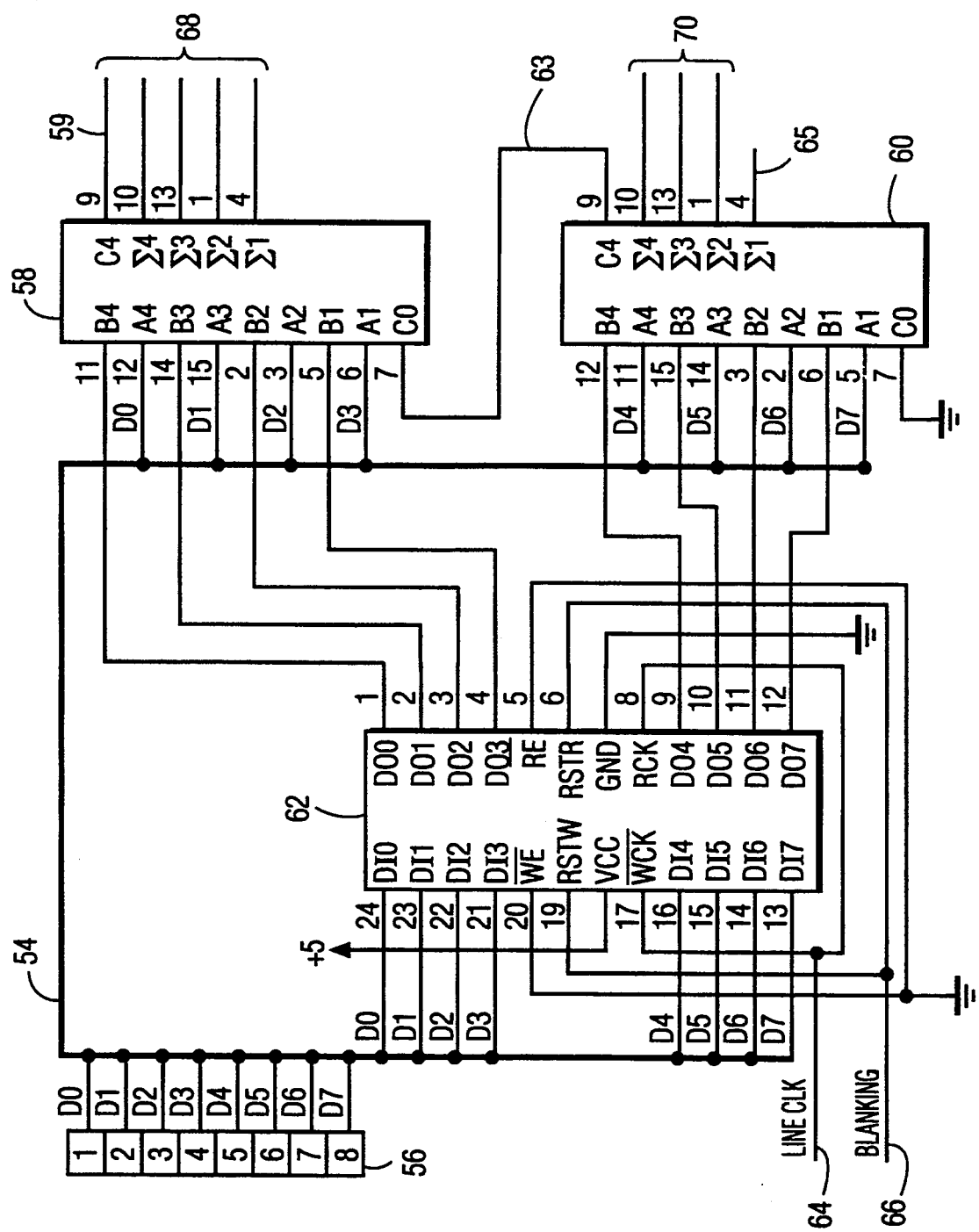
FIG. 3 depicts one example of a post processing apparatus 22 of FIG. 1.

With reference to FIG. 3, the post processing apparatus 22 requires a digital filter 23 for each color to be processed (only one is shown for simplicity). Alternatively, if Y, (R-Y), and (B-Y) signals are available, then only one digital filter 23 for luminance signals need be provided. Filter 23 functions to delay each line of video signals for one horizontal time period so that corresponding pixels from two adjacent lines can be summed. Filter 23 includes an 8-bit video signal input 56 that receives decompressed digital video from decompressor 20 and an 8-bit bus and applies the 8-bit digital word representing the gray scale level for that pixel to the 8-bit "FI-FO" digital delay line 62. Further, it applies the 8-bit digital word to one input of the 8-bit adder formed by two 4-bit adders, 58 and 60 and a carry connection 63, along with the 8-bit word exiting the digital delay 62, representing the gray scale level of that pixel from the previous line. The resulting sum is 9-bit digital word (leads 65,68, and 70). In order to restore the resulting signal to its original signal level, it is divided by 2. This is accomplished in binary simply by dropping the least significant bit, see lead 65. The remaining 8-bit word (leads 68 and 70) represents the gray scale value of the original 5-bit pixel information.

A one line delay line 62 also connects to receive the 8 bit signal from bus 54 and has its output leads connecting the first 4 bit s to adder 58 and the second 4 bits to adder 60. The outputs of adders 58 and 60 respectively are applied to coder 24.

Line clock and blanking signals on input leads 64 and 66 respectively maintain sync between delay line 62 output and the signals on bus 54.

In operation, 8 bit decompressed digital signals representing each pixel color and luminance (4 bits each) arrive at input 56. Each digital signal for each pixel in each of every other line includes a 1/32 th artificially added value as described above. Each 8 bit word is applied to the delay line 62 and to adders 58 and 60. Accordingly, the digital signal information for each pixel in one line is averaged by adders 58 and 60 with the digital signal information for the corresponding pixel in the adjacent line. This averaging produces a plus or minus pedestal error for each pixel of 1/32, thus increasing the total levels to 32 from 16, ½ of the former least significant bit in a 4 bit word. The result is equivalent to obtaining a 5 bit gray scale level representation where previously there was a 4 bit gray scale level representation. With these additional levels, the viewer perceives a sharper image that is less affected by aliasing effects introduced by the compression/decompression process. Also, diagonal lines appear sharper and less jagged because filter 23 acts as a vertical filter for line to line smoothing as well. These and other benefits result without requiring additional band width or bit rate or, stated another way, image quality can be achieved with a lower bit rate.

To illustrate one example, analog signals for all pixels in two adjacent videos lines are shown in line A and line B of FIG. 4. In this example, the values of all signals of line A are identical to the values of corresponding pixels in line B as shown. Video line A signals start at TN and include an additional 1/32 nd level pedestal added by generator 12. Line B signals start at $T_{N+1}$ and do not include the error or pedestal as described above.

The information from these signals is converted into 4-bit words (16 levels), compressed, transmitted, received, decompressed and applied to post processor 22 as described above.

Figure 4A:
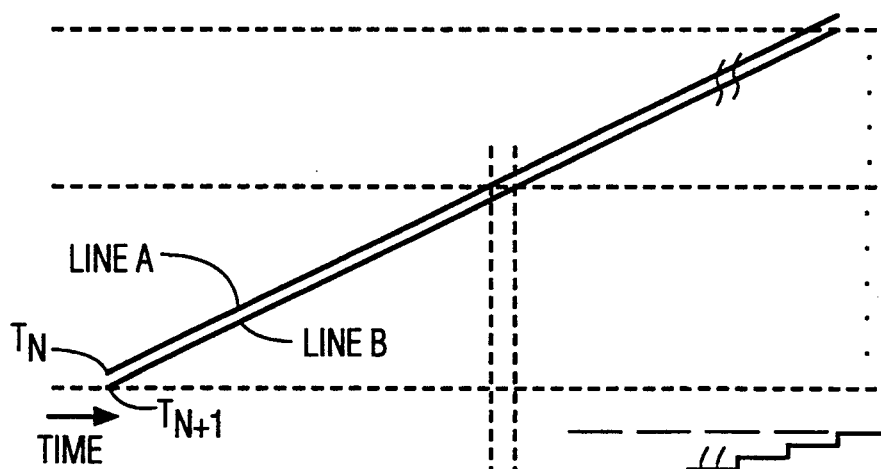
FIGS. 4A–D show signal values at certain points in the other figure.
Figure 4B:
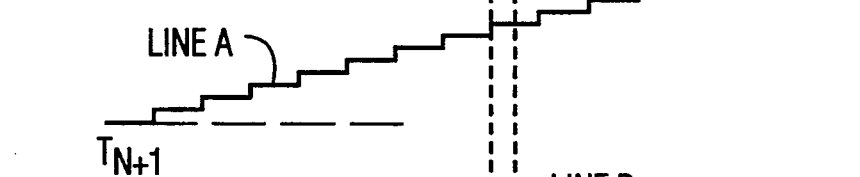

FIG. 4B shows the line A signal values on the output of delay line 62. Note that these signals start at $T_{N+1}$ and have values of one of 16 levels.

Figure 4C:
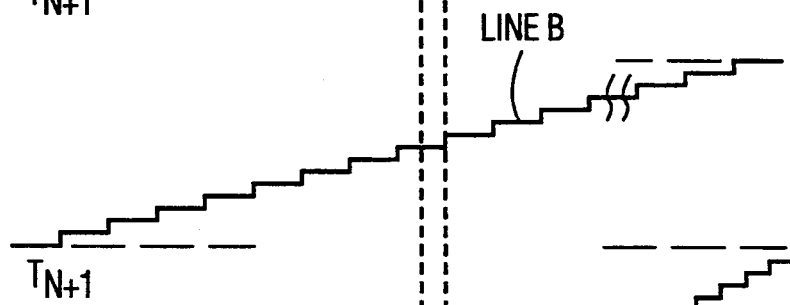

FIG. 4C shows line B signal values on bus 54 starting at $T_{N+1}$.

Figure 4D:
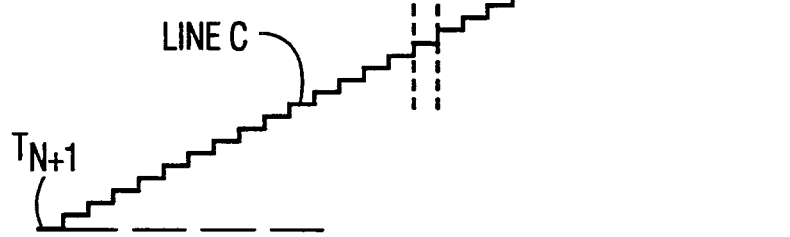

FIG. 4D shows the output of adders 58, 60. Note that 32 level signals are represented by an 9-bit word but that the maximum amplitude (value) is twice the maximum amplitude designed for the system. The circuit of FIG. 3 functions to divide the maximum amplitude value in half without reducing the number of level steps simply by dropping the least significant bit position (see unconnected lead 65). Thus, in , for example, a one volt system, where 5 bits on leads 68, 70 represent 32 levels of a two volt maximum value, by dropping the lead 65 bit position, the 5 bits now represent 32 levels of a one volt value.

One example or values of working embodiments of the preprocessing apparatus 11 and the post processing apparatus

| C3 22UF | C19 22UF | D38 1N914 | Q48 2N3904 |
|---|---|---|---|
| R5 27K | C20 .001UF | D39 1N914 | U62 UPD41101 |
| R7 510 | R25 330 | D40 1N914 | U58 74F283 |
| R9 1.5K | R27 330 | C41 .01UF | U60 74F283 |
| R15 750 | U28 LM1881 | R42 330 | |
| R17 75 | U32 74HCT74 | R44 5K | |
| R18 22K | R37 820K | U46 LM6361 | |

It should be understood that the present invention can be implemented in an circuit board or chip set configuration mounted into and used with a video terminal, i.e. a video telephone, pc or work station with video capability, etc. In these cases, the signal source or camera, transmission compression, receiving decompression, and video display are functional in one location. Each video terminal communicates with one or more other such terminals at another location through transmission media and/or private and public switched networks. The board or boards on which the preprocessing and postprocessing circuits of the present invention are mounted would be included as part of each terminal intended to have the benefits of the invention as mentioned herein.

Although the example of the present invention disclosed above employs adjacent line averaging, it will be understood that the invention can be implemented by employing other adjacent video unit averaging such as field averaging. In this case, analog signals representing all pixels in every other field will be given a 1/32 level pedestal and after decompression, all pixel levels wall be averaged with all corresponding pixel information in the next adjacent field. The benefits and results would be essentially the same as described for the hereinabove described example of FIGS. 2 and 3.

In addition, it is possible to use an adaptive combination of different adjacent video unit combination such as corresponding pixel combination in adjacent fields or frames or lines with a control circuit that switches among and applies one technique or another in response to the image dynamic or static conditions being sensed in real time.

Other and further modifications can be made to the examples herein disclosed without departing from the spirit and scope of the present invention.

I claim:

1. A compressed video bit rate reduction system comprising:
   a. transmission means including a source of video analog signals that include an original number of gray scale levels, and first means for digitizing and compressing said digital signals for transmission through a medium,
   b. receiving means including decompression means for receiving and decompressing digital video signals, second means for converting digital video signals into video display signals,
   c. preprocessing means coupled to the first means for applying an error level to at least some of the analog video signals before they are digitized by said first means,
   d. post processing means coupled to said second means for processing each video signal that includes the error information with a video signal that does not include the error information,
   e. said preprocessing means includes means for applying said error level to all analog signals representing pixels of one video unit, and
   f. said post processing means derives gray scale level information from processing each pixel representing signal of said one video unit with the corresponding pixel signal of another video unit which said corresponding pixel signal does not include an error level information.

2. The system of claim 1, wherein said error level comprises substantially one half the level of the least significant division of the maximum amplitude of the analog video signal, and said post processing means derives gray scale level information which represents, in addition to the original number of gray scale levels, ½ of the level between each original gray scale level.

3. The system of claim 2, wherein said first means converts analog video signals into 4-bit digital video signals, and wherein said post processing means derives gray scale information in a 5-bit digital video signal.

4. The system of claim 3, wherein said post processing means comprises a one video unit delay means and means coupled thereto for combining a pixel representing digital signal of the first video unit to the corresponding pixel representing digital signal of an adjacent video unit and for dividing by a factor the combination of the information of said signals.

5. The apparatus of claim 3 wherein said post processing means comprises a one video unit delay means and means coupled thereto for combining a pixel representing digital signal of the first video unit to the corresponding pixel representing digital signal of an adjacent video unit and for dividing by a factor the combination of the information of said signals.

6. Apparatus for reducing the bit rate of compressed digital video systems having a source of video analog signals that include an original number of gray scale levels and first means for digitizing and compressing said digital signals for transmission through a medium, and receiving means including decompression means for decompressing the received digital video signals and second means for converting digital video signals into video display signals, the apparatus comprising preprocessing means adapted to be coupled to said first means for applying an error level to at least some of the analog video signals before they become digitized by said first means, and further comprising post processing means adapted to be coupled to said second means for processing each signal that includes the error information with a signal that does not include the error information.

7. The apparatus of claim 6 wherein the error level comprises substantially one half the level of the least significant division of the maximum amplitude of the analog video signal when converted into digital video signals, and said post processing means derives gray scale information which represents, in addition to the original gray scale levels, ½ of the level between each original gray scale level.

8. The apparatus of claim 7 wherein said first means converts analog signals into 4-bit digital video signals, and wherein said post processing means derives gray scale information in a 5-bit digital video signal.

9. A method of reducing the bit rate for transmission of compressed digital video signals, comprising
  a. increasing the level of at least some of the analog video signals of a video unit,
  b. converting said signals to digital signal representations,
  c. compressing said digital signals for transmission,
  d. after reception, averaging the digital signals of said video unit with corresponding digital signals of an adjacent video unit to produce a digital signal with greater information content than the information content of the first mentioned digital signal representations.

10. The method of claim 9, wherein said first mentioned digital signals comprise x-bit video representations of gray scale level and wherein said last mentioned digital signal comprises a y factor of (x+1) - bit video representations of gray scale level where y is greater than zero but less than one.

* * * * *